N. S. HARTER.
CLUTCH.
APPLICATION FILED SEPT. 13, 1920.
1,437,243. Patented Nov. 28, 1922.
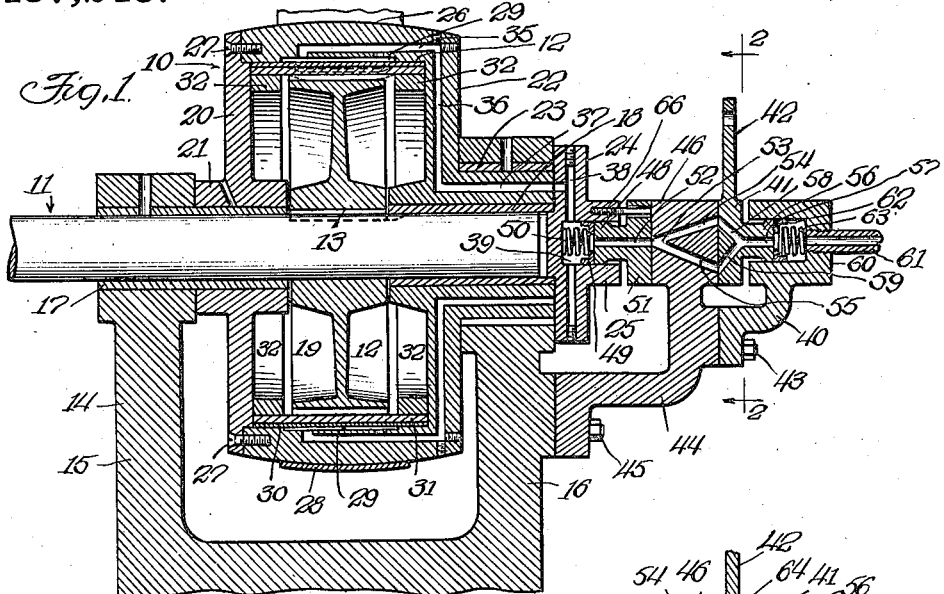
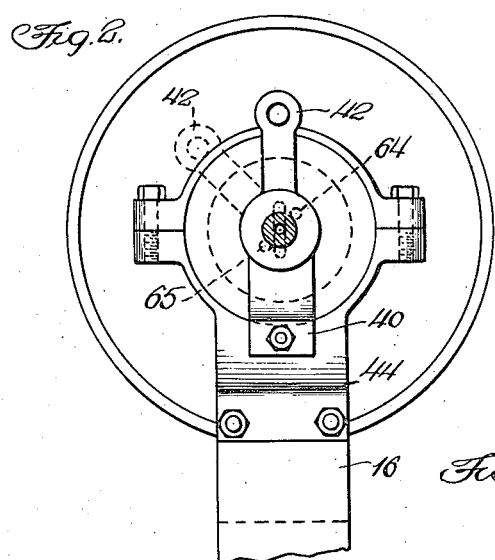
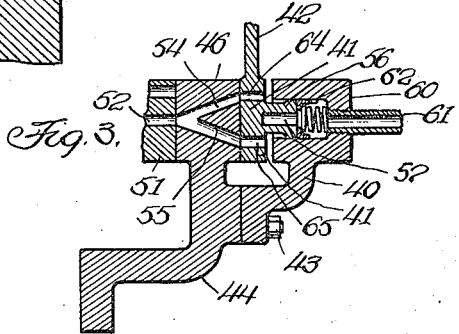
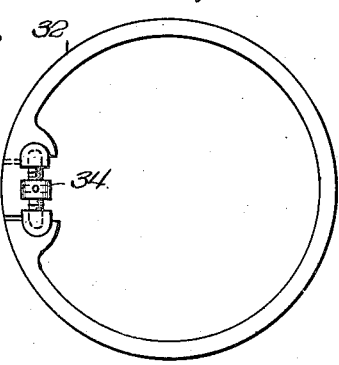
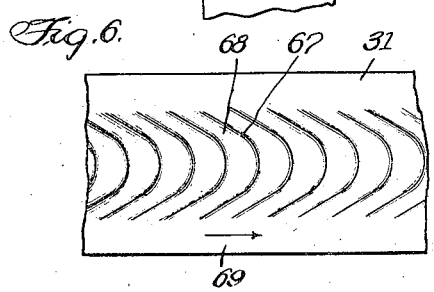
Inventor:
Noah S. Harter
By Jones Bain & Hinkle
Attys.

Patented Nov. 28, 1922.

1,437,243

UNITED STATES PATENT OFFICE.

NOAH S. HARTER, OF WAUKEGAN, ILLINOIS, ASSIGNOR TO CYCLONE FENCE COMPANY, A CORPORATION OF ILLINOIS.

CLUTCH.

Application filed September 13, 1920. Serial No. 409,770.

*To all whom it may concern:*

Be it known that I, NOAH S. HARTER, a citizen of the United States, residing at Waukegan, in the county of Lake and State of Illinois, have invented certain new and useful Improvements in Clutches, of which the following is a specification.

The invention relates to improvements in clutches.

Some of the objects of the invention are to provide a clutch that is under perfect control of the operator; which can be started slowly and gradually and instantly stopped; which can be operated to maintain the driven member at a substantially constant speed at or below that of the driving member; which will require very little effort on the part of the operator to control it; which may be operated and maintained with a given constant amount of slip between the driving and driven members.

Another very important object is the provision of a clutch in which the moving member, for causing engagement of the driving and driven members, is so light of weight that said members may be engaged and disengaged rapidly in situations where high speed and frequent starting and stopping are required.

Another object is generally to improve clutches of this character.

In the drawings,

Fig. 1 is a central, vertical section of an embodiment in which my invention is illustrated.

Fig. 2 is a sectional view looking at the clutch on line 2—2 of Fig. 1.

Fig. 3 is a section of the valve operating mechanism showing the exhaust ports open.

Figs. 4 and 5 are end and side views, respectively, of an expansion ring used for the purpose of holding the friction shoe and the diaphragm in place on one of the clutch members.

Fig. 6 is a plan view of one of the forms of a flexible annular shoe carried by one of the clutch members and brought into contact with the other by the application of compressed air.

In all the views the same reference characters are employed to indicate similar parts.

In the structure illustrated are two concentrically arranged pulleys, the inner pulley being rotatably fixed to a shaft and the outer, surrounding pulley being freely rotatable about the shaft axis. An annular shoe, which well may be a leather belt, surrounds the face of the inner pulley and is carried by the outer pulley. When the inner pulley is driven and compressed air is applied to the outer surface of the shoe it is thus made to forcibly engage the face of the inner pulley and cause the outer pulley to be rotatably connected therewith. On account of the superficially large engaging surface of the intermediate shoe, with the inner pulley, it requires but very slight pressure to produce sufficient friction to rotate the outer pulley sufficiently positive for all practical purposes. The drive is impositive at all times thus insuring safety and relieving machinery driven thereby of unnecessary shocks and strain.

It is manifest, of course, that the shaft or the outer pulley may either be the driving or the driven member. In the specification, for the purpose of description, I have referred to the shaft and the pulley positively connected therewith, as the driving member, and to the outer surrounding freely rotatable pulley as the driven member, and I have indicated the driven member by the reference character 10 and the shaft by the reference character 11, the pulley rigidly secured to the shaft by the reference character 12. 13 is a key shown as a means for securing the pulley 12 to shaft 11. A housing 14 supplies bearings for the structure and is provided with standards 15 and 16. A bearing sleeve 17 is secured in the standard 15 and extends inwardly of the standard. A bearing sleeve 18 is secured in the bearing carried by the standard 16 and also extends inwardly. The sleeves 17 and 18 terminate at the hub 19 of the pulley 12 and afford bearings for the driven member 10. The pulley, or driven member 10, is made of a disc 20, having a hub 21 freely rotatable upon the sleeve 17. Another disc 22 that has a hub 23 is freely rotatable upon the sleeve 18. To the outer end of the hub 23 is secured a disc structure 24 provided with a hub 25 coaxial with the shaft 11. Between the discs 20 and 22 is a rim 26 affording the pulley face of the driven member 10 and secured to the discs, as by screws 27 or otherwise. In the present illustration a belt 28 surrounds the pulley 10 and is a means by which power may be transmitted therefrom.

Now when the shaft 11 is driven or rotated, the pulley 12 will be rotated therewith by virtue of the key 13 firmly connecting the shaft and pulley 12 together, but the driven member 10 will not be rotated because there is now no connection between the pulley 12 and the driven member 10.

In the rim 26 is a counter bore 29 with a continuous shoulder on each side thereof and overlying the counter bore is an annular flexible diaphragm 30, and inside of the diaphragm 30 is an annular friction shoe 31, preferably composed of a leather belt or band made endless and neatly fitting the inner diameter of the rim 26. An expansion ring 32 is split, as at 33, and is provided with a right and left hand screw 34 to expand it. One of the expansion rings is placed in the outer pulley on each side of the member 12, as shown in Fig. 1 and when in place they are expanded so as to firmly hold the diaphragm and the friction shoe in contact with the rim. A plurality of holes 35 are bored into the rim and are made to communicate with the counter bore 29 and another series of holes, 36, are bored thru the disc 22 and communicate with holes 37 in the hub 23. The holes 37 communicate with radial holes 38 made into the disc 24. The hub 25 of the disc 24 may be counterbored to provide an axial opening 39. The conduit thus made, by conjunction of the plurality of holes described, conveys the air from the counter bore 39 to the counterbore 29 radially beyond the flexible diaphragm 30.

A bracket 40 carries the air-controlling valve 41, the latter being manually rotatable by means of a handle 42. The bracket 40 is supported by cap screws 43 on the bracket 44, the latter being supported on the frame 16 by cap screws 45. Co-axial with the shaft 11, on the upper end of the bracket 44, is a hub 46 having parallel polished and preferably hardened surfaces. A plunger 48 extends into the counter bore 39 and on its front end is secured a cup-leather 49 which is held in intimate contact with the inner end of the plunger 48 by means of an expansion, helical spring 50. The outer end of the plunger 48 is expanded into a disc 51 which bears upon the inner polished surface of the hub 46. The contacting face of the disc 51 is also polished and makes substantially perfect or air-tight contact with the polished surface of the hub 46. The plunger or hub 48 and the disc 51 are axially perforated, as at 52, which perforation is a continuate part of the air conduit. The perforation 52 connects with a perforation 53 in the hub 46, which latter is bifurcated into branches 54 and 55.

The valve 41 is provided with a plunger or hub 56 which is also axially perforated, as at 57, the latter perforation being bifurcated into branches 58 and 59, which register with the branches 54 and 55 when air is to be conducted thru the conduit heretofore described.

A hub 60 is a part of the bracket 40 and is axially perforated for the air supply pipe 61. The inner end of the plunger 56 is in contact with the cup leather 62 which is pressed into contact with the plunger by means of an open helical spring 63. When the valve 41 is manually rotated into the position shown in Fig. 3, the communication is shut off from the air supply pipe 61 and the ports 64 and 65 are brought into register with the branches 54 and 55 in the hub 46 and as these ports, 64 and 65, are open to the atmosphere, the air is exhausted from the conduit, heretofore described, and the counter bore 29 in the driven member 10.

A pin 66 projects from the end of the hub 25 loosely into an opening in the disc 51, and permits the axial movement of the hub 48 and disc 51 but causes them to be positively rotated with the driven member.

The leather shoe 31, which makes frictional contact with the pulley 12, by the effect of compressed air and the flexible diaphragm 30, is preferably slit at intervals, as at 67, to make it more flexible. The slits 67 produce a series of tongues 68, each of which makes bearing contact upon the face of the inner pulley and when the direction of movement of the pulleys coincides with the direction indicated by the arrow 69, in Fig. 6, the tongues are as strong as if the belt was unslit or undivided, as shown.

The centrifugal effect, when the driven member 10 is rotated at a high speed, will cause the tongues 68, of the shoe 31, to quickly leave contact with the outer face of the pulley 12, when air pressure thereon is released, and the tongues will as readily and quickly be moved into contact with the face of the driving pulley, upon the application of air to the overlying diaphragm.

The overlying diaphragm 30 may be made of any relatively flexible, impervious cloth or fabric, such as may have rubber incorporated therewith. The diaphragm is not directly brought into frictional contact with the face of the inner pulley 12, in relatively large structures, on account of the effect of wear thereon. The shoe 31 is placed between the diaphragm and driving pulley because it is better adapted to withstand the strain and wear. In small structures the shoe may not be used, the diaphragm directly contacting the driving pulley.

There are many changes in form and disposition of the parts that may be made in the disclosed structure within the scope of the appended claims.

Having described my invention what I claim as new and desire to secure by Letters Patent is:—

1. A clutch having an inner pulley and an outer pulley relatively rotatable about the same axis and having their rims substantially parallel; an annular flexible diaphragm secured at its circumferential side edges to the rim of one of said pulleys; a shoe, between the diaphragm and the rim of the other pulley, rotatable with the diaphragm-carrying pulley; and an air conveying conduit leading from the axis of the structure to a point between the diaphragm and the pulley that carries it; a conduit leading from said axis to a source of air supply and a valve connecting said conduits to control the operation of said clutch.

2. A clutch having in combination an inner pulley and an outer pulley independently rotatable about the same axis; an annular diaphragm secured at its side edges to the rim of the outer pulley; an annular, flexible shoe between the diaphragm and the inner pulley, secured at its side edges to the outer pulley; an air conduit leading thru the outer pulley and terminating between the inner surface of the rim of the outer pulley and said diaphragm; a valve to open and close said conduit and means to rotate one of said pulleys.

3. A clutch having in combination an inner pulley within an outer pulley said pulleys independently rotatable about the same axis; an annular diaphragm secured continuously at its edges to the rim of the outer pulley; an annular flexible shoe, between the diaphragm and the inner pulley, carried by the outer pulley; an air conduit leading from said axis to the rim of the outer pulley and terminating between the inner surface of the rim of the outer pulley and said diaphragm; and a conduit leading to a source of air supply.

4. A clutch having in combination an inner pulley and an outer pulley independently rotatable about the same axis, the inner surface of the outer pulley having an annular counter bore with a continuous shoulder on each side of the counter bore; an annular diaphragm bridging the counter bore and secured at its edges to said shoulders; an endless belt secured in like manner to the outer pulley and parallel with the diaphragm and means to introduce air under pressure into the counter bore whereby to force the belt into frictional driving contact with the face of the inner pulley and means to rotate one of said pulleys.

5. A clutch having in combination an inner pulley and an outer pulley independently rotatable about the same axis, the inner surface of the outer pulley having an annular counter bore with a continuous shoulder on each side of the counter bore; an annular diaphragm bridging the counter-bore and secured at its edges to said shoulders, a belt or shoe secured in like manner to the outer pulley; an expansion ring one for each edge of the belt and diaphragm to clamp them into engagement with the respective shoulder; means to introduce air under pressure into the counter bore whereby to force the belt into frictional driving contact with the face of the inner pulley; means to exhaust the air from the said counter bore and means to rotate one of said pulleys.

6. A clutch having in combination an inner pulley and an outer pulley independently rotatable about the same axis, the inner surface of the outer pulley having an annular counter-bore with a continuous shoulder on each side of the counter-bore; an annular diaphragm and a belt, the latter having a plurality of tongues and secured to the shoulder of the outer pulley; an expansion ring for each edge of the belt and diaphragm to clamp them into engagement with the respective shoulder; means to introduce air under pressure into the counter-bore whereby to force the belt into frictional driving contact with the face of the inner pulley and means to rotate one of said pulleys.

In testimony whereof I hereunto subscribe my name.

NOAH S. HARTER.